April 4, 1967   A. A. STRIPLING ETAL   3,312,934
MEASURING ACOUSTIC VELOCITY OVER TWO TRAVEL PATHS
Filed July 12, 1963
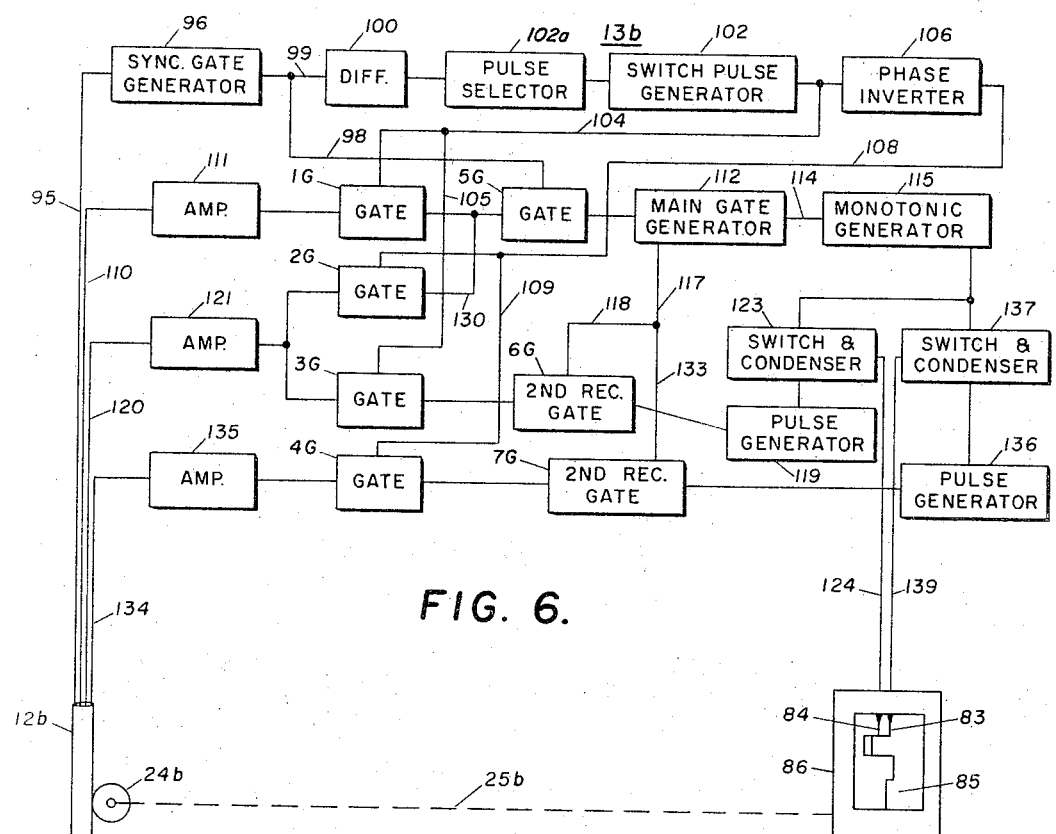
FIG. 6.
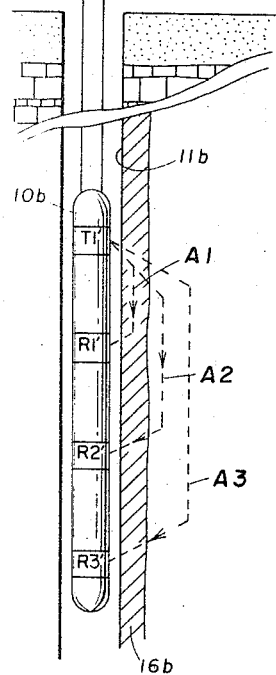
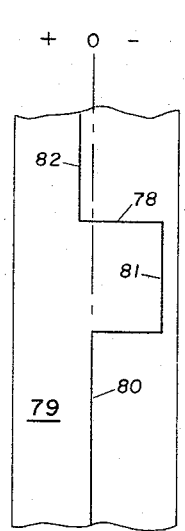
FIG. 8.
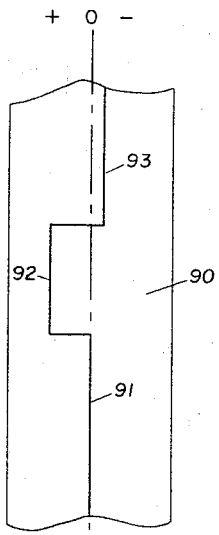
FIG. 9.
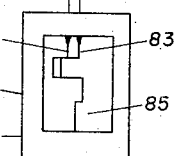
FIG. 5.

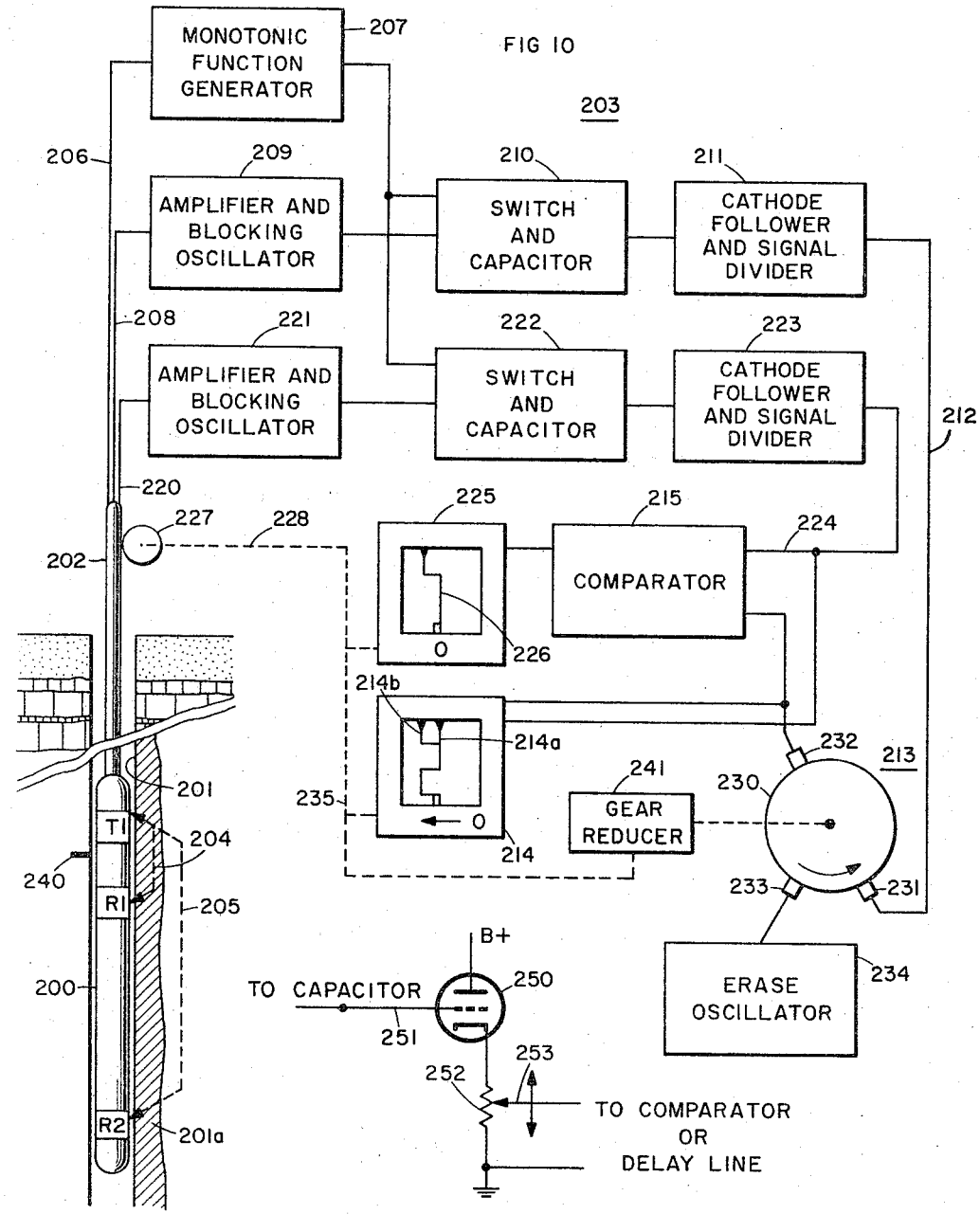

United States Patent Office 3,312,934
Patented Apr. 4, 1967

3,312,934
MEASURING ACOUSTIC VELOCITY OVER
TWO TRAVEL PATHS
Allen A. Stripling and Joseph Zemanek, Jr., Dallas, Tex., and Warren G. Hicks, deceased, late of Grand Prairie, Tex., by Sibyl A. Hicks, legal representative, Grand Prairie, Tex., assignors to Mobil Oil Corporation, a corporation of New York
Filed July 12, 1963, Ser. No. 295,598
15 Claims. (Cl. 340—18)

This application is a continuation-in-part of applicants' prior application Ser. No. 785,485, filed Jan. 7, 1959, now abandoned.

The present invention relates to methods of and apparatus for velocity logging of earth formations traversed by a well bore and more particularly to methods of and apparatus for obtaining the velocity characteristics of those earth formations or sections adjacent to and those remote from the wall structure of the well bore and has for an object the acquisition of new information accurately interpretable of the velocity characteristics of earth formations traversed by a well bore.

Another object of the present invention is the preparation of information indicative of the presence or absence of hydrocarbons in earth formations remote from the wall structure through comparison with earth formations adjacent a well bore in which fluid content has been altered as by invasion of drilling fluids and the like.

Another object of the present invention is to provide a well logging system having a plurality of transducers including at least one transmitter and at least three receivers for producing a first function representing the travel time of an acoustic pulse between a first pair of said transducers and for generating a second function representing the travel time of an acoustic pulse between a second pair of the transducers and for generating the difference between the first and second functions.

Another object of the present invention is to provide an acoustic well logging system including at least one transmitter and at least three receivers and including gating means at the surface of the earth for separating electric signals from the transducers into at least two pairs of electric signals so that the time interval between each pair of electric signals indicates acoustic velocity.

Significant advances have been made in recent years in the art of well logging which have placed new tools in the hands of geophysicists for the investigation of subsurface earth formations. One of these advances, continuous velocity logging, is exemplified by United States Patent No. Re. 24,446 to Gerald C. Summers. The information contained on a velocity log is significant for two reasons. Inasmuch as the velocity of sound through earth strata of differing characteristics varies with and is identifiable of the strata, it is possible when studying an accurate incremental velocity log to infer the identification of strata such as limestone, shale and sand. In addition, by integration of the incremental velocities, it is possible to formulate a log, as disclosed and claimed in Broding et al. United States Patent 2,905,258 which depicts the travel time of a sound pulse from the earth surface to any point penetrated by the well. With this latter information, a geophysicist has at his disposal a tool which will permit him more accurately to interpret the information contained in a seismogram. That is, he will be able accurately to locate the depth of changes in earth formations giving rise to the reflections or pulses appearing on the seismogram.

While all this is possible with a continuous velocity log, much has been left desired in the way of accuracy regarding the incremental travel time and the total travel time as produced by integration of the incremental travel time. This deficiency has been noted in the past by comparing the integrated log at various selected depths with geophone tie-points taken at the same selected depths. Comparisons have shown that the integrated travel time is usually higher in value than the travel time measured by geophone tie-points and the difference will vary in magnitude from one well to another.

We have found that the greatest error exists where substantial alteration has been done the formations as by drilling fluids and the like wherein there has been created within a portion of the earth formation adjacent the well bore an acoustic path whose velocity characteristic differs substantially from the velocity characteristic of the same earth formation along an acoustic path remote from the wall structure of the well bore. Thus, for example, where the earth formation being traversed by the well bore is a swelling or hydrophilic shale, that is, one that readily absorbs water, there results a swelling condition which materially lowers the velocity characteristic of the formation; and the resultant velocity log taken of the damaged portion will indicate an incremental travel time substantially longer than the travel time of acoustic energy through the undamaged formation.

In accordance with the present invention, there is produced information useful not only in the accurate analysis of seismograms but also in the analysis of the earth formations themselves, giving rise to the ready identification of hydrocarbon-bearing formations. The information is obtained by probing the earth with acoustic pulses and then generating a function related to the elapsed time interval for an acoustic pulse to travel along a path through the earth formation adjacent the well bore and over a predetermined length or vertical distance between two spaced points. The earth is again probed with another acoustic pulse and there is generated a second function related to the elapsed time interval for an acoustic pulse to travel along a path remote from the well bore over approximately the same vertical distance. The functions are then recorded as a function of depth.

The function related to the travel time along a path remote from the well bore accurately will represent travel time through the earth formation, and the integration of such information will be useful in the study of seismograms taken locally. The recording of the first function depicting travel time along a path through the earth formation adjacent the well bore will represent the change, if any, in the condition of the earth formation and will be useful in determining the presence or absence of hydrocarbons in the formation. For example, a sand saturated with oil has a lower velocity characteristic than the same or similar sand saturated with water. Therefore, if an oil-bearing sand formation be invaded with drilling fluid containing water, the first log will show a higher velocity through the sand formation than the second log. The combination of the two logs will represent the presence of hydrocarbons in the sand formation.

More particularly, in accordance with the present invention there is provided, in a system for producing records representative of the velocity characteristics of earth strata traversed by a well bore, means for producing pulses of acoustic energy at least a portion of which travel through the earth formation along a path adjacent the wall structure of the well bore and at least a portion of which travel through the formation along a path more remote from the wall structure of the well bore than the first-mentioned path. Means responsive to the acoustic energy traveling along the first-mentioned path produce a function representative of the velocity characteristic of the earth formation traversed by the path, and means responsive to the acoustic energy traveling along the second-named path produce a second function representative of the velocity characteristic of the same earth formation at a portion remote from the well bore.

The functions are then recorded with respect to a depth function.

Further in accordance with the present invention, where the transducers employed in generation of the two velocity or time functions are unequally spaced, the total time measurement is in each case connected to travel time per common unit distance and then compared. In one embodiment the time measured is converted to microseconds per foot.

For other objects and attendant advantages of the present invention, reference may be had to the following detailed description taken in conjunction with the accompanying drawings in which:

FIG. 3 illustrates typical earth formations to be encountered in oil exploration and examples of logs, produced in accordance with the present invention, to which the earth formations give rise;

FIG. 5 is a fractional portion of a logging system disclosing a second embodiment of the present invention;

FIG. 6 is a block schematic illustrating a third embodiment of the present invention;

FIGS. 8 and 9 illustrate fractional portions of typical logs produced with the system of FIG. 6;

FIG. 10 is a block schematic illustrating a fourth embodiment of the present invention; and FIG. 11 illustrates a circuit for converting total time to travel time per unit distance.

Figure 1:
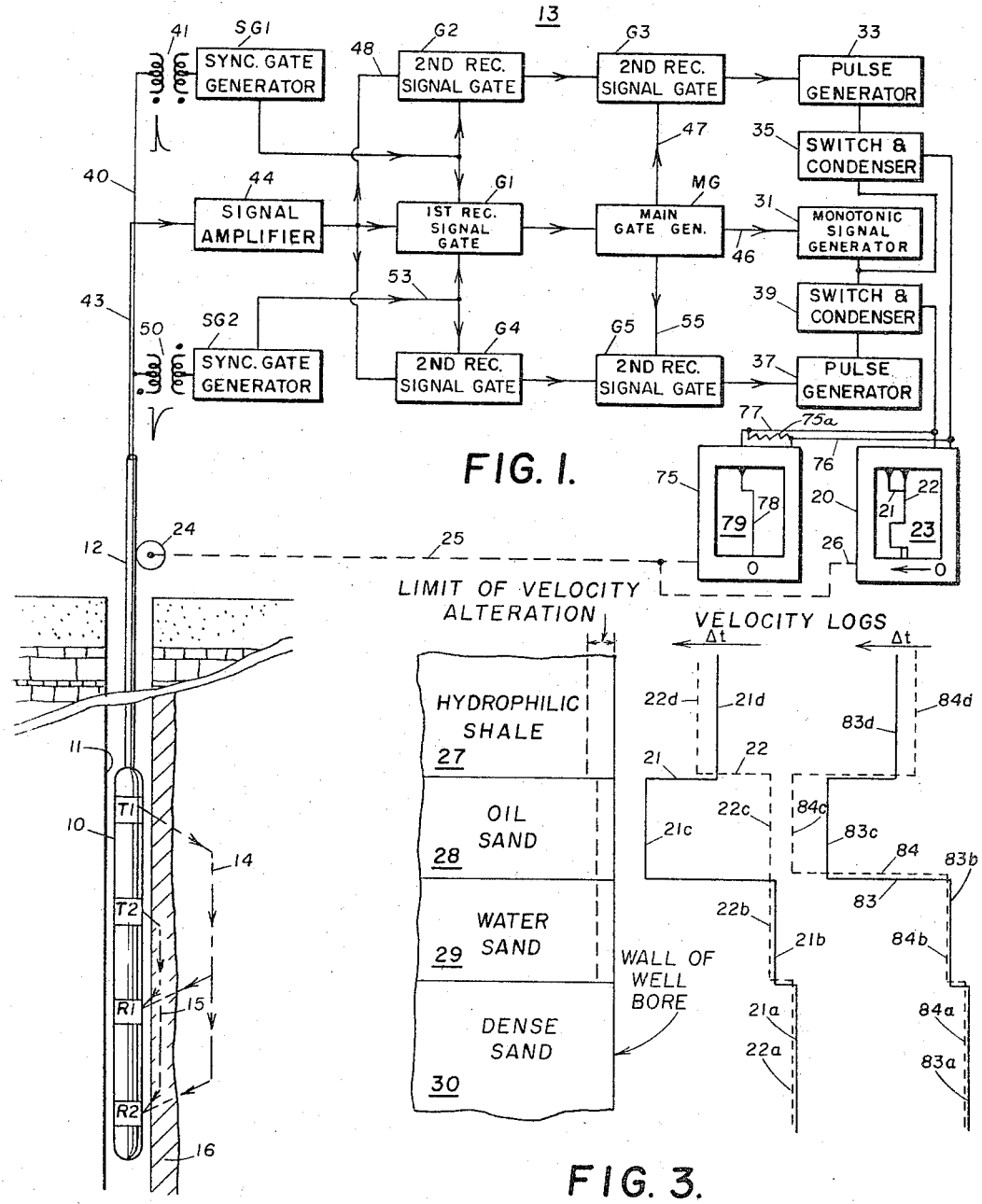
FIG. 1 is a block schematic of a velocity logging system embodying the present invention.

Referring now to FIG. 1, there is illustrated a logging tool 10 supported for movement along the length of a borehole 11 by way of a supporting cable 12. The cable 12 includes transmission circuits for the conduction of electrical functions from a plurality of transducers in the logging tool 10 to a time interval measuring system located at the surface of the earth. The transducers include transmitters T1, T2 and receivers R1 and R2 physically and/or electrically arranged in the logging tool 10 such that functions produced thereby are related to and representative of the velocity characteristics of earth strata taken along paths adjacent to and paths remote from the wall of the borehole or well bore 11. More particularly, a first function produced by circuits comprising a first combination of transducers including the transmitter T1 and receivers R1, R2 is representative of the velocity characteristics of the earth strata traversed by an acoustic pulse traveling along a first path 14 remote from the wall of the well bore or borehole 11. A second function produced by circuits comprising a second combination of transducers including the transmitter T2 and receivers R1 and R2 is representative of the velocity characteristics of the earth strata traversed by an acoustic pulse traveling along a second path 15 adjacent the wall of the well bore or borehole 11. If the acoustic pulses traveling between the receivers R1 and R2 traverse structure of identical velocity characteristics, the time interval measured by the uphole system 13 will be identical. On the other hand, any differences existing between the characteristics of the earth strata traversed by the first path and the characteristics of the strata traversed by the second path will be indicated by a difference in the magnitude of the time intervals registered or recorded by the uphole measuring system 13. Such latter condition is represented in FIG. 1 by an altered zone 16 which may be caused by the absorption of liquids such, for example, as, water, from drilling muds employed in drilling the well bore 11. This information is useful in determining not only the physical condition of the earth strata but is also useful, as will become apparent hereinafter, in the location of hydrocarbon-producing zones in the earth traversed by the well bore 11.

Useful information is obtainable by direct comparison of the data produced by way of the embodiment of FIG. 1 inasmuch as the transducers employed in both time or velocity measurements are the same, i.e., the receivers R1 and R2.

In one embodiment of the present invention, two velocity logs are produced. One of them is representative of the velocity characteristics of earth strata traversed by acoustic energy along a path remote from the well bore and the second log represents the velocity characteristics of the same earth strata traversed by acoustic energy along a path adjacent the well bore. These logs are recorded by a recorder 20 shown to be of the strip chart type and appear, respectively, as traces 21 and 22 on the chart 23. The chart 23 is driven as a function of the depth of the borehole tool 10 by way of a driving connection including the sheave 24 and mechanical connections 25 and 26.

Enlarged portions of the traces 21 and 22 are illustrated in FIG. 3 adjacent a cross section of the earth comprised of typical formations encountered during the course of well logging and including a hydrophilic shale 27, an oil sand 28, a water sand 29, and a dense sand 30. The oil sand 28 and the water sand 29 usually are found as a homogeneous sand formation divided by the water-oil interface. A separate showing is here made for purpose of discussion. The hydrophilic shale is to be considered as representative of shales and other formations which readily absorb drilling fluids, for example, water, and as a result are damaged thereby in the sense that their velocity characteristic is substantially changed. The extent or limit of the water or fluid infusion has been illustrated in FIG. 3 as the limit of velocity alteration. The dense sand 30 is to be considered as representative of other formations which resist to a large extent the infusion of water and thus may be considered not susceptible to damage. This is confirmed by portions 21a and 22a of the velocity logs wherein both traces very closely overlay each other to indicate the same velocity measurement produced by traverse of the formation by acoustic energy along both the remote and near paths. While a separation has been shown between the portions 21a and 22a, such separation is made here for purposes of clarity in the illustration of two distinct traces and it will be understood that in general the portions 21a and 22a will overlay one another. As the logging tool now begins to traverse the water sand 29, the time for the acoustic energy to traverse a given distance will substantially increase due to the decrease in elastic moduli of the water-sand formation and therefore the velocity will decrease. Though the water sand will accept some of the water from the drilling fluid, there will be no substantial change as between the measured velocities derived from the acoustic energy traversing the near and remote paths.

Coming now to the oil sand, a different condition will exist. An oil-impregnated sand has a lower velocity than an equivalent sand saturated with water. The acoustic energy traversing the near path will go through the water-invaded portion of the oil sand and the measured velocity will be the same as that for a water sand as represented by the portion 22c of the log. However, the acoustic energy traversing the remote path will pass through the oil sand and the log produced from this information will depict, as represented by the trace 21c, a much lower velocity. When these two portions of the log are compared, it will be evident to the interpreter that the formation 28 is a hydrocarbon-producing zone containing either gas or oil, or both. As the logging tool now begins to traverse the hydrophilic shale 27, the velocity at which the acoustic energy passes through the damaged portion will be less than the velocity of acoustic energy through the undamaged section. This condition is represented by the portions 22d and 21d of the trace.

The velocity characteristic of the damaged section is decreased by reason of the shale swelling with absorption of water.

It is apparent, therefore, that the logs as represented by traces 21 and 22 will provide for an interpreter a complete picture of formation conditions traversed by the borehole 11 immediately distinguishing the damaged sections and oil-producing zones. Heretofore, with only trace 22 available for interpretation, a badly damaged zone, such as, the hydrophilic shale 27, might be interpreted, because of its low velocity characteristic, to be an oil-producing zone whereas the oil sand 28 would be missed and interpreted as a water sand.

Now that the principles of the invention have been set forth, reference will be made to systems suitable for the practice of the invention and embodying further aspects thereof. The time interval measuring system 13 (FIG. 1) incorporates the principles of U.S. Patent Re. 24,446 to Gerald C. Summers wherein the generation of a monotonic function, preferably a linear sweep voltage, is initiated with the arrival of an acoustic pulse at the first receiver and the instantaneous magnitude of the function is measured at a time corresponding with the arrival of the same acoustic pulse at the second receiver. The measured value of the function is representative of the travel time of the acoustic pulse between the two receivers; and, because the two receivers are maintained a fixed distance apart, this time interval is also a function of the velocity characteristics of the earth strata bounded by the two receivers.

Figure 2:
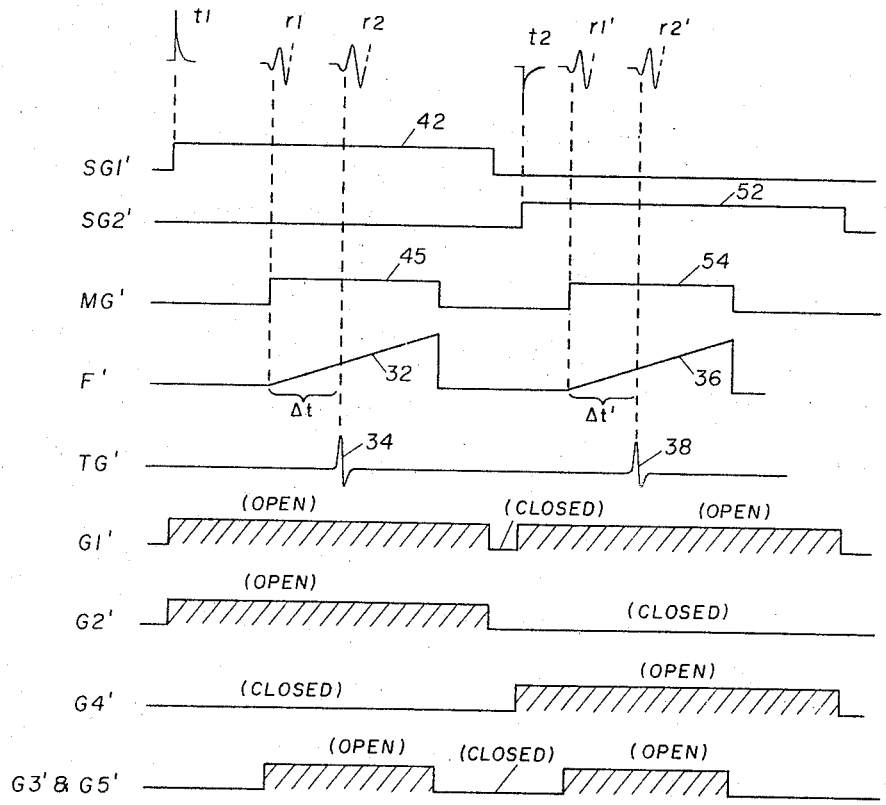
FIG. 2 is a diagrammatic sketch helpful in the understanding of the system of FIG. 1.

The general operation of the measuring system 13 above described may be better understood by reference to the various waveforms illustrated in FIG. 2 wherein portions of the signals produced by the first and second receivers R1 and R2 in response to acoustic energy arriving from the first transmitter T1 are respectively represented by signals $r1$ and $r2$. On the other hand, portions of the electrical signals produced by the same receivers R1 and R2 in response to the arrival of acoustic energy from the second transmitter T2 are represented by the signals $r1'$ and $r2'$. With the arrival of the signal $r1$ uphole, a monotonic signal generator 31, of the type described in the aforesaid Summers patent, begins the production of a monotonic function shown as the linear sweep signal or function 32 forming part of the trace F'. With the arrival uphole of the signal $r2$ from the second receiver R2, a pulse generator 33 responds to produce pulse 34 shown as part of the trace TG' which operates a switch and condenser unit 35 to sample the instantaneous value of the sweep signal 32. The elapsed time between the arrival of the signals $r1$ and $r2$ is represented by $\Delta t$, and this value is recorded by the recorder 20 as one point on the trace 21. The details of the switch and condenser unit 35 are set forth in the aforementioned Summer's patent in FIG. 3.

After a predetermined time interval, the second transmitter T2 produces an acoustic pulse which upon arrival at the first receiver R1 results in the production of the signal $r1'$. The monotonic signal generator 31 responds to the arrival of the signal $r1'$ uphole to again begin the generation of a monotonic function represented by the linear sweep signal or function 36, forming a portion of the trace F' (FIG. 2). A pulse generator 37, similar to pulse generator 33, responds to the arrival of the acoustic energy at the second receiver R2 and more particularly to the resulting signal $r2'$ to produce a pulse 38, forming a portion of the trace TG'. Switch and condenser unit 39 responds to the pulse 38 and in a manner like that of switch and condenser unit 35 samples the instantaneous value of the sweep signal 36, which value represents the elapsed time $\Delta t'$. The value of $\Delta t'$ is recorded on the chart 23 of recorder 20 as one point of the trace 22.

The uphole measuring equipment is capable of distinguishing between the receiver signals in the production of the two velocity logs. Therefore, only one monotonic generator is required for the measurement of the velocity of acoustic energy along two different paths through earth formations. This is accomplished by the use of gating means and in a manner hereinafter described.

Upon the generation of an acoustic pulse by the first transmitter T1, a synchronizing pulse $t1$ is sent uphole and is applied by way of conductor 40 and coupling transformer 41 to trigger a sync gate generator SG1. The generator SG1 produces an output pulse 42 shown in FIG. 2 as forming part of the trace SG1' which is effective for opening the normally closed first receiver signal gate G1 and second receiver signal gate G2. The generator SG1 is preferably a monostable multivibrator of the type shown in FIG. 5.12 at page 170 of Waveforms by Chance et al., copyrighted 1949 by McGraw-Hill Book Company. Both gates G1 and G2 may be of the type shown in United States No. 2,597,796. Upon arrival of the acoustic energy at the first receiver R1 by way of the remote path 14, the signal $r1$ is applied uphole by way of conductor 43 to the input of a signal amplifier 44. The amplifier 44 may be of any of several types well-known to those skilled in the art and comprising one or more stages of amplification. The output of amplifier 44 is then applied by way of first receiver signal gate G1 to trigger a main gate MG which also may be a pulse generator of the monostable multivibrator type similar to generator SG1. The generator MG produces an output pulse 45 illustrated in FIG. 2 as a portion of the trace MG' which is applied by way of conductor 46 to initiate operation of the monotonic signal generator 31 to produce the linear function 32.

The main gate generator MG also applies a gating pulse as by way of conductor 47 to open the normally closed second receiver signal gate G3, which may be of the same type as gate G1. A path is now open for a signal $r2$ from the second receiver R2 to the pulse generator 33. With the arrival of the acoustic pulse at the second receiver R2, the signal $r2$ is applied uphole by way of conductor 43 to the input of the signal amplifier 44. The output of amplifier 44 is applied by way of conductor 48 and the open signal gates G2 and G3 to the input of the pulse generator 33, a blocking oscillator which may be of thte type illustrated in the aforementioned Summer's patent. The switch and condenser 35 responds to the puse 34 produced by the pulse generator 33 to sample the instantaneous magnitude of the linear function 32. The sampled value is then applied to recorder 20 for recording on the chart 23 as part of the trace 21.

The system 13 of FIG. 1 includes means for selectively conditioning portions thereof for operation in response first to the signals generated by a first combination of transducers comprising the transmitter T1 and the receivers R1 and R2 and then in response to the signals from a second combination of transducers comprising the transmitter T2 and the receivers R1 and R2. Such selective operation is performed in part by a series of gates G1–G5.

The various states of the gates G1–G5 are illustrated in FIG. 2 by the traces G1'–G5'. It will be observed that during the operation above described in connection with the first combination of transducers, gates G1 and G2 are opened, gate G4 is closed, and gates G3 and G5 are initially closed. Therefore, the first electric signal coming uphole from the receivers, the signal $r1$, is effective to trigger the monotonic signal generator by reason of an open path including the signal amplifier 44 and the first gate G1. The path to the pulse generator 33 is closed to the signal $r1$ by reason of the gate G3 being closed. The path to the pulse generator 37 is blocked by the closed gate G4. After the monotonic signal generator 31 begins to operate, the gate G3 is opened, in response to pulse 45 from generator MG, providing a path for the second receiver signal $r2$ to the pulse generator 33. The gate G4 is still closed to prevent the application of the second receiver signal $r2$ to the pulse generator 37.

Now following the generation of an acoustic pulse by the transmitter T2 and upon arrival of that pulse at the first receiver R1, an electric signal $r1'$ is applied by way of open gate G1 to again trigger the monotonic function generator 31. Gate G4 is opened in response to pulse 52 from generator SG2. Thereafter, gate G5 opens in response to pulse 54 applied from generator MG by way of conductor 55. The second receiver signal $r2'$ passes through open gates G4 and G5 to trigger the pulse generator 37 to sample or otherwise measure the instantaneous value of the monotonic function.

More particularly, the gates and measuring equipment operate in the following manner in the measurement of a time interval determined from the signals produced by the second group of transducers including the transmitter T2 and the receivers R1 and R2. At the instant of generation of the acoustic pulse by the second transmitter T2, a synchronizing signal $t2$ (FIG. 2) is applied by way of conductor 40 and transformer 50 to the input of a sync gate generator SG2.

The sync gate generator SG2 in response to the sync pulse $t2$ produces in its output a gating pulse 52, shown in FIG. 2, forming a portion of the trace $SG2'$. The output pulse 52 is applied by way of conductor 53 to the inputs of the first receiver signal gate G1 and the second receiver signal gate G4. A path is now open between the first receiver R1 and the main gate generator MG. Upon arrival of the acoustic pulse at the first receiver, the electric signal $r1'$ is applied uphole and by way of conductor 43 to the input of the signal amplifier 44. The amplified output is then applied by way of the open signal gate G1 to trigger the main signal gate generator MG. The output of the main gate generator MG, pulse 54, is shown in FIG. 2 as a portion of the trace MG which is applied by way of conductor 46 to initiate the generation of the linear sweep function 36 by the monotonic signal generator 31. At the same time a gating pulse is applied from the generator MG and by way of conductor 55 to open the second receiver signal gate G5.

Upon arrival of the acoustic pulse at the second receiver R2, the electric signal $r2'$ is produced and is applied to the pulse generator 37 by way of a path including conductor 43, signal amplifier 44, signal gate G4 and signal gate G5. The pulse generator 37 produces in its output the pulse 38 (FIG. 2) which is effective to open the switch and condenser unit 39 for sampling the instantaneous value of the monotonic function 36. The resulting sampled voltage is applied to recorder 20 where it appears as a portion of trace 22 on chart 23.

In the operation of the equipment described above, it will be understood that provision will be made in the input of the main gate generator MG to render it non-responsive to any signals applied thereto following its response to the first receiver signals $r1$ or $r1'$ and during the time of generation of the pulses 45 or 54.

It will be noted from FIG. 2 that gates G2 and G4 are alternately opened and closed. The condition of these gates is determined by pulses generated by the sync gate generators SG1 and SG2, respectively, producing pulses 42 and 52. This mode of operation is produced by rendering the sync gate generators respectively responsive to the synchronizing signals $t1$ and $t2$ from the transmitters T1 and T2.

In the embodiment of the invention illustrated in FIG. 1, the sync gate generators SG1 and SG2 are made responsive to positive pulses and the synchronizing pulses $t1$ and $t2$ are of opposite polarity. Pulse $t1$ is positive-going and pulse $t2$ is negative-going. Transformer 41 is connected as shown to produce a positive pulse in its secondary in response to sync pulse $t1$ and a negative pulse in response to sync pulse $t2$. Transformer 50 is connected as shown to produce a positive pulse in its secondary in response to sync pulse $t2$ and a negative pulse in response to sync pulse $t1$. The pulse $t1$ passes through the transformer 41 without changing polarity and will be effective to trigger the sync gate generator SG1. However, this same pulse is reversed in polarity by the transformer 50 and therefore is ineffective to trigger the sync generator SG2. On the other hand, the sync pulse $t2$ being negative-going in character is reversed by the transformer 50 and appears in the secondary thereof as a positive-going pulse effective to trigger the sync gate generator SG2. The same negative-going pulse $t2$ is unaffected in polarity by the transformer 41 and appears in the secondary thereof as a negative-going pulse ineffective to trigger the sync generator SG1.

Figure 4:
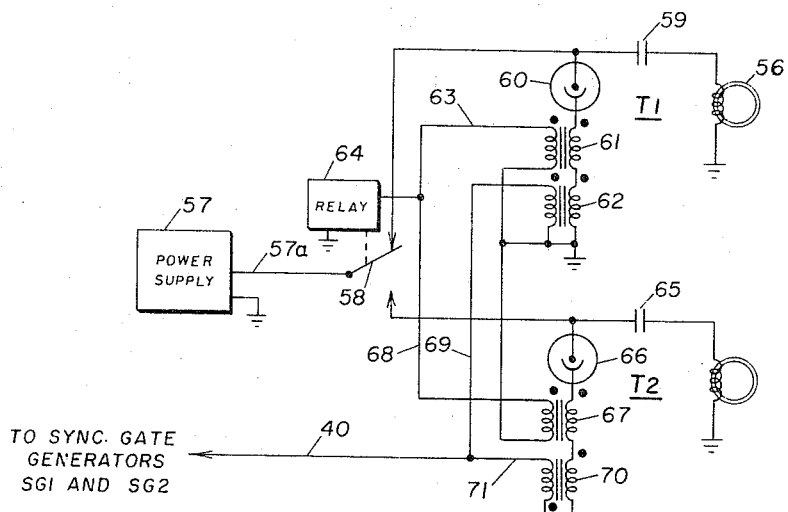
FIG. 4 is a circuit schematic of acoustic pulse generators useful in the practice of the present invention.

An arrangement for synchronizing the operation of the transmitters T1 and T2 for alternate operation and for the production of positive-going and negative-going sync pulses is illustrated schematically in FIG. 4. Each of the transmitters T1 and T2 is similar to the transmitter described and claimed in United States Patent No. 2,737,639 to Summers et al. Since both transmitters are identical, a description of the operation of one of them will suffice for the other. The transmitter T1 includes a magnetostrictive element or transducer 56 which, as well-known in the art, changes its physical dimensions with flow of current therethrough to produce an acoustic pulse. Surges of current through the magnetostrictive element 56 are produced in the following manner. A D.C. voltage obtained from power supply 57 is applied by way of conductor 57a and relay controlled switch 58 to a capacitor 59. When the charge on the capacitor 59 reaches the breakdown voltage of discharge tube 60, current will flow in a path that may be traced from the grounded side of the transducer 56 thence by way of condenser 59, tube 60, and the primary windings of the transformers 61 and 62 and thence back to ground. Discharge tube 60 may be of the 1B22 type. The flow of current through the primary winding of transformer 61 will induce a voltage in the secondary winding of the same transformer which voltage is applied by way of conductor 63 to energize relay 64 to move the movable contact of switch 58 into engagement with the lower fixed contact thereof and now begin the application of the D.C. current to begin the charging of condenser 65 of transmitter T2. When the condenser 65 has been charged to a voltage equivalent to the breakdown voltage of discharge tube 66, current will flow through the primary winding of transformer 67. The current flow in the primary side of transformer 67 induces a voltage in the secondary side thereof and this voltage is applied by way of conductor 68 to once again operate the relay 64 to cause the return of the movable contact of switch 58 to its illustrated position. Once again the condenser 59 begins to charge-up for the production of a second pulse from the transmitter T1. Thus, with the operation of each transmitter the relay 64 will be operated to connect the power supply 57 to the other transmitter, resulting in a continued alternate production of pulses by the transmitters T1 and T2.

Each time the transmitter T1 produces a pulse, the current flowing through the primary winding of transformer 62 induces a pulse into the secondary winding of the transformer, which pulse is applied uphole by way of conductors 69 and 40 to the sync gate generators SG1 and SG2 of FIG. 1. The secondary winding of the transformer 62 is so poled with respect to the primary that the sync pulse transmitted over the conductors 69 and 40 is positive-going in character and is represented by the pulse $t1$ (FIG. 2). On the other hand, each time the transmitter T2 produces a pulse the current flowing through the primary winding of transformer 70 produces in the secondary thereof a synchronizing pulse which is negative-going in character. This negative-going pulse represented by the pulse $t2$ (FIG. 2) is applied by way of conductors 71 and 40 to the sync gate generators SG1 and SG2 of FIG. 1. The change in polarity which renders the sync pulse produced by the transmitter T2 negative-going in polarity is produced by a poling of the secondary winding of transformer 70 with respect to the primary winding thereof. Accordingly, the arrangement of FIG. 4 causes the production of synchronizing pulses which are immediately identified with the transmitter producing the acoustic pulse, and these synchronizing pulses are then employed uphole to condition the measuring equipment or system 13 to respond to the proper combinations of downhole transducers comprising the logging tool 10.

In one embodiment of the present invention the various transducers comprising the exploring element or well logging tool 10 were spaced along the length of the tool in the following manner. The distance between the first receiver R1 and second receiver R2 was three feet. The distance from the first receiver R1 to the second transmitter T2 was three feet, and the distance from the first receiver R1 and the first transmitter T1 was nine feet. These dimensions are merely exemplary of one embodiment suitable for practice of the present invention and are not to be considered as limitations on the scope of the invention.

With large spacing between the first transmitter and the first receiver it is assured that any signal energy from the first transmitter tending to reach the first receiver by way of the damaged zone is attenuated and that signals of magnitude detectable by the first receiver will arrive at the receiver by way of the remote path 14 through the undamaged or unaltered sections of the formation. The transmitter T2 is positioned close enough to the receivers R1 and R2 so that the first arrival energy is by way of the damage formations.

Another manner of obtaining different depths of penetration is to treat signal attenuation as a function of transmitter frequency. Therefore, if the signal generated by the first transmitter is made to have a low frequency or, otherwise stated, if the first transmitter signal has a wave length very long with respect to the thickness of the altered zone maximum attenuation will be observed in signals traveling through the altered zone. The only signal reaching the receivers and of sufficient magnitude to be detected thereby will have traveled by way of the unaltered or deep zone. On the other hand, if the signal from the second transmitter T2 has a wave length that is much shorter than the wave length of the first transmitter signal little attenuation will result and the signals traveling through the altered zone will be detected by the receivers.

Transmitters T1 and T2 having different output signal frequencies are employed in an arrangement illustrated in FIG. 5 and with receivers R1 and R2 comprise the logging tool 10a. The output pulse from the first transmitter T1 is of low frequency while the output signal from the second transmitter T2 is of a higher frequency. For example, the frequency from the first transmitter may be of the order of 10,000 cycles per second, whereas the signal from the second transmitter T2 may be of the order from 25,000 cycles per second to 40,000 cycles per second. The acoustic energy from the first transmitter will travel by way of the path 14a through the undamaged portion of the formation while the acoustic energy first reaching the receivers from the second transmitter will travel alnong the path 15a through the damaged portion of the formation. The only change necessary to employ the embodiment of FIG. 5 would be a change in the size of the magnetostrictive elements employed in the transmitters T1 and T2. For example, the magnetostrictive element employed in one embodiment for transmitter T1 was very large in diameter compared with the diameter of the magnetostrictive element employed in the second transmitter T2.

While either of the arrangements of FIG. 1 or FIG. 5 may be employed with the measuring system 13 of FIG. 1, it is preferred to employ a combination of the arrangements to employ the advantages of each in a logging tool in which the first transmitter T1 will be spaced a long distance from the first receiver compared with the distance of the second transmitter to the first receiver and the frequency of the signal produced from the first transmitter will be low compared with the frequency of the signal produced by the second transmitter.

In accordance with a further modification of the present invention, there is provided an arrangement wherein the log produced is in the terms of relative velocities. Such a log will illustrate the difference in the instantaneous values of the velocities measured by the system 13 and represented by the traces 21 and 22. The log is useful in depicting damaged zones and hydrocarbon-bearing formations. In carrying out this aspect of the present invention, there is provided in the system of FIG. 1 a second recorder 75 to which the outputs from the switch and condenser units 35 and 39 are applied, respectively, as by way of conductors 76 and 77. The recorder 75 includes in its input circuit a comparator circuit for comparing the outputs of units 35 and 39. The comparator circuit may be comprised simply of a high impedance such as a resistor 75a connected across the lines 76 and 77 such that the input to the recorder 75 will be a signal which is the difference between the magnitudes of the signals appearing at the outputs of the switch and condenser units 35 and 39. The resultant log will be a trace 78 appearing on the chart 79 and representative of the physical conditions of the formations and also representative of the presence or absence of hydrocarbons. An enlarged portion of trace 78 is illustrated in FIG. 8. Where the velocities recorded by the switch and condenser units 35 and 39 are the same as when the logging tool 10 (FIG. 1) is traversing the dense sand 30 and the water sand 29 (FIG. 3), the log of FIG. 8 will illustrate a zero difference velocity portion 80. However, as soon as the logging tool begins to traverse the oil sand 28, a difference in the measured velocities will occur as represented by the portions 21c and 22c of the traces 21 and 22. The resultant difference voltage will produce on the chart 79 (FIG. 8) a trace portion 81 which will indicate to the interpreter that the uninvaded zone is of lower velocity than the invaded zone and therefore there exists a strong possibility that the zone contains hydrocarbons. Now, when the logging tool begins to traverse the hydrophilic shale 27 (FIG. 3), the recording pen of the recorder 75 will move to the left, indicating that the damaged zone is of lower velocity than the undamaged zone and will produce on the chart 79 a trace portion 82 which immediately will be recognized as representing the presence of a hydrophilic shale and the extent thereof.

Having fully described one system and associated modifications of the present invention, it will be apparent that other modifications may be employed for carrying out the method described above.

An example of such further modifications is shown in FIG. 6 wherein the downhole instrument 10b is comprised of a plurality of transducers including the transmitter T1' and receivers R1', R2', and R3'. The physical distance between the transducers of instrument 10b is such that the acoustic energy from the transmitter T1' arriving at the first receiver R1' travels by way of path A1 through the damaged portion 16b of the formation, the acoustic energy arriving at the second receiver R2' travels by way of path A2 through an undamaged portion of the formation, and the energy reaching the third receiver R3' travels by way of a path A3 through the undamaged portion of the formation. The signals produced by the receivers in response to the arrival of acoustic energy are transmitted uphole by way of conductors within cable 12b and applied to a measuring system 13b.

The output of the measuring system is representative of the incremental velocity of the formation being traversed by the logging instrument 10b and is recorded as traces 83 and 84 on a chart 85 of recorder 86. The chart 85 is driven in accordance with the position of the logging instrument in the well bore by way of a mechanical connection including a sheave 24b and a mechanical linkage 25b.

The characteristics of the traces 83 and 84 produced on the chart 85 are more clearly illustrated in FIG. 3 opposite the typical earth cross section comprised of the various formations 27–30. The solid-line trace 83 represents the response of this borehole tool configuration to the velocity or incremental travel time characteristics of a zone of the formation remote from the well bore, while the dotted-line trace 84 represents the response of this borehole tool configuration to the velocity of a zone of the formation adjacent the well bore. It will be remembered from previous discussion that the dense sand 30 and the water sand 29 are not affected by well bore drilling fluids; and, therefore, as expected, the portions 83a, 84a, and 83b, 84b of traces 83 and 84 will coincide. However, when the logging tool 10b begins to traverse the invaded oil sand 28, the respective veolcities or the incremental travel times recorded by the instruments will be displayed as represented by the portions 83c and 84c of traces 83 and 84. It will be noted that the apparent velocity of the altered zone or formation 28 measured with the system of FIG. 6 is much lower than the true velocity of the uninvaded zone. This is the reverse of data obtained with the system of FIG. 1 and for the following reason. If the invaded zone 16b is of a higher velocity than the uninvaded zone as is the case of an invaded oil sand formation, the acoustic energy traveling by way of the path A1 through the invaded zone will arrive at a high rate of speed at the first receiver to initiate the operation of the time interval measuring system 13b. In the meantime, the energy to be received by the second receiver R2' is traveling by way of the path A2 through the lower velocity formation. The net result is the recording of an apparent velocity that is much lower in value than the velocity of the uninvaded zone.

Since the acoustic energy received by the receivers R2' and R3' travels by way of paths A2 and A3 through the uninvaded formation, the velocity recorded in response to signals transmitted uphole from these receivers will be the actual or true velocity of the formation.

On the other hand, as the logging instrument begins to traverse the hydrophilic shale or swelling shale formation 27, the apparent velocity as represented by portion 84d of trace 84 will be much higher than the true velocity of the undamaged portion or zone and for reasons similar to those resulting in the traces 83c and 84c opposite the oil sand. In the latter situation, the acoustic energy traveling from the transmitter T1' by the way of path 80 through the damaged formation travels at a rate of speed that is much lower than the speed at which the same acoustic energy is traveling toward the second receiver R2' by way of path 81. The net result is the measurement of an incremental velocity that is higher than that which would be obtained if the acoustic energy traveled to both receivers by way of the same path.

Expecting the results set forth above, the traces obtained by the embodiment of FIG. 6 are as useful as those obtained by the embodiment of FIG. 1 in that an interpreter will know that when the apparent velocity of a formation taken along a path adjacent the borehole is less than the velocity of the formation taken along a path remote from the well bore the possibility of a hydrocarbon-bearing formation exists. On the other hand, should the reverse condition prevail, the observer or interpreter will know that the zone traversed by the logging instrument 10b is a damaged shale. With this in mind, the condition may be summarized as follows. When the velocity of trace 83 is greater than the velocity of trace 84, there is a possibility that the formation traversed may be an oil-bearing one. Where the trace 83 is less than the trace 84, the zone or formation traversed may be interpreted as a damaged shale. Accordingly, it is now possible to combine the outputs to the recorder 86 to form a composite recording as shown in FIG. 9. The recording is derived in the manner as explained above in connection with recorder 75 (FIG. 1) to provide on chart 90 a single trace 91. The portion 92 represents the condition where trace 83 is of higher velocity than trace 84, and the portion 93 represents the condition where the trace 83 is less than the trace 84.

In the operation of the system of FIG. 6, a measurement of incremental travel time or incremental velocity is first made with a combination of transducers including the transmitter T1' and receivers R1' and R2'. A second measurement is made with a combination of transducers including the transmitter T1' and receivers R2' and R3'. In the discussion to follow, it will be helpful in the understanding thereof to refer to the waveforms and gate conditions illustrated in FIG. 7.

Figure 7:
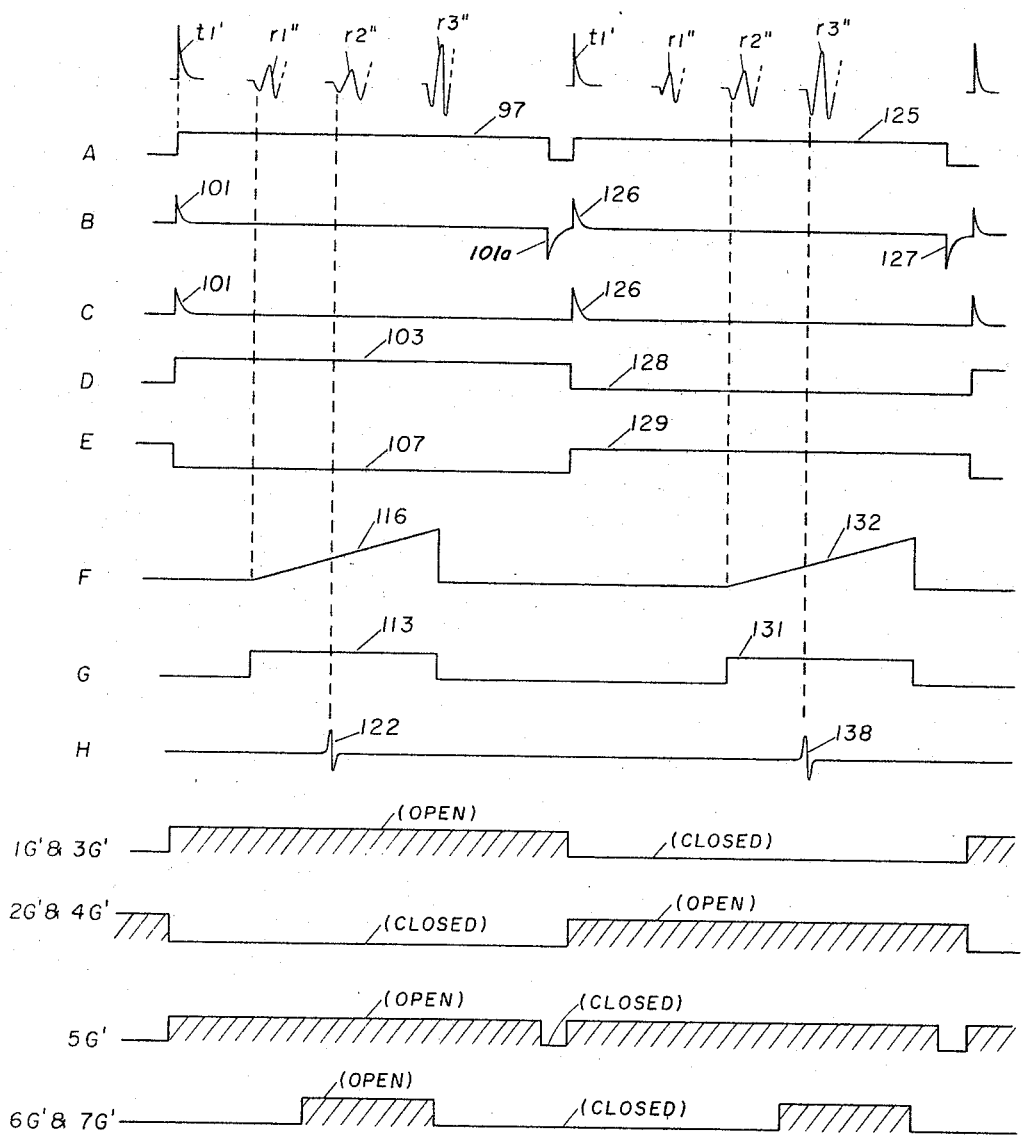
FIG. 7 is a diagrammatic sketch helpful in the understanding of the system of FIG. 6.

Upon generation of an acoustic pulse by the transmitter T1', a synchronizing pulse t1' is sent uphole and applied by way of conductor 95 to the input of a sync gate generator 96. The generator which may be of the monostable multivibrator type, similar to sync gate generator SG1 (FIG. 1), responds to the sync pulse t1' to produce an output pulse 97 (FIG. 7) shown as a part of the trace A. The output pulse 97 is applied by way of conductor 98 immediately to open gate 5G. At the same time, the output pulse 97 is applied by way of conductor 99 to a differentiator 100 for opening gates 1G and 3G. The conditions of the gates are illustrated by the trace 1G' and 3G'. Each of the gates 1G–4G responds to a positive-going pulse so that when gates 1G and 3G are closed gates 2G and 4G are opened. The reverse is also true. The gates 1G–4G are selectively operated in the following manner. The output of the differentiator 100 comprised of pulses 101 and 101a, shown as part of trace B in FIG. 7, is applied to a pulse selector, preferably a half-wave rectifier, which passes only the positive-going pulses 101 as shown in trace C. Switch pulse generator 102, a bistable multivibrator which may be of the type disclosed in Waveforms beginning at page 164, responds to the pulse 101 to generate a control pulse 103, shown as part of the trace D, which applied by way of conductors 104 and 105 is effective to open gates 1G and 3G. At the same time, the pulse 103 is applied to a phase inverter 106, which may be provided by an amplifier stage, whose output, the pulse 107 shown as part of trace E, is applied by way of conductors 108 and 109 to the gates 2G and 4G. Because the output from the phase inverter is negative-going, the gates 2G and 4G remain closed.

The uphole measuring system 13b with gates 1G and 3G opened is now ready to respond to electrical signals produced by the receivers R1' and R2' upon arrival thereat of the acoustic energy from the transmitter T1'.

Upon arrival of the acoustic energy at the first receiver R1', an electric signal r1'' is sent uphole and applied by way of conductor 110 to the input of amplifier 111. The output of the amplifier is then applied by way of the open gates 1G and 5G to a main gate generator 112 which may be a multivibrator of the cathode-coupled, monostable type previously mentioned. The generator has two outputs, both of them being represented by pulse 113 forming part of the trace G. One of the signals is applied by way of conductor 114 to trigger the monotonic generator 115 for production of a monotonic time function represented by the linear sawtooth pulse 116 forming part of trace F. At the same time, the other output of the generator 112 is applied by way of conductors 117 and 118 to open the second receiver gate 6G to complete a circuit from the second receiver R2' to a pulse generator 119.

When the acoustic energy arrives at the second receiver

R2', an electric signal r2" is sent uphole by way of conductor 120 to the input of amplifier 121. The amplified output is then applied by way of open gates 3G and 6G to the input of the pulse generator 119 which responds thereto to produce a trigger pulse 122 shown forming a part of the trace H. A switch and condenser unit 123, similar to the switch and condenser unit 35 of FIG. 1, responds to the trigger pulse 122 to sample the instantaneous value of the linear sawtooth pulse or monotonic function 116. The sampled value of the monotonic function is then applied by way of conductor 124 to the recorder 86 which responds to record one point of the trace 84.

The third receiver R3' will also produce an electric signal upon arrival of the acoustic energy. However, this signal is blocked uphole by the closed gate 4G.

After a time period adequate for the performance of the above-mentioned measuring cycle, the transmitter T1' again produces an acoustic pulse. Once more the synchronizing pulse t1' is sent uphole over conductor 95 where it triggers the sync gate generator 96. Gate 5G is again opened in response to the output of pulse 125 of the generator 96. The pulse 125 is differentiated by the differentiator 100 to produce pulses 126 and 127. The pulse selector 102a selects pulse 126 for application to the switch pulse generator 102. This time the switch pulse generator 102 produces an output signal or pulse 128 which is negative-going in character and therefore incapable when applied by way of conductors 104 and 105 to open gates 1G and 3G. However, the phase inverter 106 now has an output pulse 129 that is positive-going in character and effective when applied by way of conductors 108 and 109 to open gates 2G and 4G.

Upon arrival of the acoustic energy at the first receiver R1', the electric signal r1" is sent uphole but is blocked at the closed gate 1G. The second receiver R2" produces the electric signal r2" which is sent uphole and by way of conductor 120, amplifier 121, gate 2G, conductor 130, and gate 5G to the input of the main gate generator 112. The main gate generator responds to the signal r2" to produce two output signals, both of which are represented by pulse 131 forming a portion of trace G. The first pulse triggers the monotonic generator 115 for production of the monotonic function represented by linear sawtooth wave or pulse 132 forming part of trace F. The second instance pulse is applied by way of conductors 117 and 133 to open a second receiver gate 7G.

With the arrival of the acoustic pulse at the third receiver R3' as by way of path 82 through the undamaged portion of the formation, an electric signal r3" is generated and sent uphole by way of conductor 134 to the input of an amplifier 135. The output of amplifier 135 is applied by way of open gates 4G and 7G to trigger the pulse generator 136. A switch and condenser unit 137, similar to the switch and condenser unit 123, responds to the output of pulse generator 136, a pulse 138, shown as a portion of trace H, to sample the instantaneous value of the monotonic function or linear waveform 132. The sampled value is then applied by way of conductor 139 to the recorder 86 where it appears as a single point of trace 83.

The next time the transmitter T1' produces an acoustic pulse, the uphole measuring system 13b will measure the time interval elapsed between arrival of the acoustic energy at the receivers R1' and R2' to once again produce a function representative of the acoustic velocity characteristics of the invaded zone 16b. The system will thereafter continue to alternate with each generated acoustic pulse the measurement of the velocity characteristics of the invaded and uninvaded zones.

In each of the embodiments thus far described the time measurement has taken place between transducers equally spaced one from the other. For example, in the embodiment of FIG. 1 the time measurement took place between the same two transducers, i.e., the receivers R1 and R2. In the embodiment of FIG. 6 the time measurement took place between the receivers R1', R2' and between R2', R3'. The spacing between receivers R1', R2' is the same as the spacing between receivers R2', R3'. Because the transducers involved in the time measurement were either the same transducers, or transducers equally spaced one from the other, it is apparent that a direct comparison could be made between the time measurements.

There will now be demonstrated the manner in which the method of the present invention may be carried out by way of a system 203, FIG. 10, wherein the transducers involved in the time measurement, or velocity determination, are spaced unequal distances apart. The comparison in this instance will be made possible by converting each total time measurement produced by the transducers to a time measurement over a unit distance, for example, microseconds per foot, microseconds per two feet, etc.

The system 203 of FIG. 10 includes a downhole logging tool 200 supported for movement along a borehole 201 by way of a cable 202. The logging tool 200 includes a plurality of transducers comprising a transmitter T1 and two receivers R1 and R2. The receivers are physically located to one side of the transmitter and spaced predetermined distances therefrom such that in the presence of a damaged section of the well bore the acoustic energy arriving at the first receiver R1 will be by way of a path adjacent the well bore, and the acoustic energy arriving at the receiver R2 will be by way of a path remote from the well bore. More particularly, when the logging tool 200 is in the presence of the damaged zone 201a, the acoustic energy arriving at the receiver R1 from the transmitter T1 will travel by way of a path 204 through the damaged zone. On the other hand, the energy arriving at the receiver R2 from the transmitter T1 will travel by way of the path 205 through the undamaged zone of the formation.

Two time measurements are made each time the transmitter T1 is fired. The first time measurement is made employing two transducers, the transmitter T1 and the receiver R1. The second time measurement is made by employing two transducers, the transmitter T1 and the receiver R2.

Each time the transmitter T1 fires, a sync pulse is generated and transmitted uphole by way of conductor 206 in cable 202 to trigger a monotonic function generator 207 to initiate the production of a monotonic function. Upon the appearance of acoustic energy at the receiver R1, an electrical signal is generated and transmitted uphole to initiate the sampling of the instantaneous magnitude of the monotonic function. The receiver signal is conducted over the conductor 208 to an amplifier and blocking oscillator unit 209. There, the electrical signal is amplified and converted to a trigger pulse. The trigger pulse is applied to switch and capacitor unit 210 which, in manner similar to the operation of the units 35 or 39 of FIG. 1, is effective to place upon a capacitor a charge or potential representative of the instantaneous magnitude of the monotonic function and in turn representative of the travel time of acoustic energy between the transmitter T1 and the receiver R1.

The capacitor unit 210 is coupled to a cathode follower and signal divider unit 211 whose functions are to isolate the capacitor included in the unit 210 so that its charge remains unchanged between successive samplings of the monotonic function generated by the generator 207 and to convert the total travel time represented by the potential or voltage on the capacitor of unit 210 to a potential representative of travel time per unit distance. The output from the signal divider unit 211 is applied by way of the conductor 212 and delay means 213 to the input of a two-trace recorder 214 and to an input of a comparator 215.

Upon arrival of the same acoustic pulse or acoustic energy at the receiver R2, an electric signal is generated and applied uphole by way of conductor 220 to the input of a second amplifier and blocking oscillator 221. The electric signal is amplified and a trigger pulse generated for application to a second switch and capacitor unit 222. The new value of the same monotonic function, which previously had been instituted in response to the sync pulse from the transmitter T1, is now sampled and that value applied to and stored by a capacitor within the unit 222. The potential, or charge, on the capacitor within the unit 222 is applied to a second cathode follower and signal divider 223. The signal divider of the unit 223 converts the total travel time, representative of travel time from the transmitter T1 to the receiver R2, into a representation of travel time per unit length, the same unit length to which the travel time representation from capacitor unit 210 was converted by the cathode follower and signal divider 211.

The new value of travel time is now applied from the signal divider unit 223 by way of conductor 224 to a second input of comparator 215 and to a second input of recorder 214. The travel time signal from the unit 223 is compared by the comparator 215 with the delayed travel time signal from the unit 211 and a difference signal is applied to the input of a recorder 225 where it appears as a trace 226.

The charts of both recorders are driven in response to movement of the logging tool by way of a sheave 227 mechanically connected, as represented by the dashed line 228, to the chart drive inputs of the recorders.

The difference trace 226 will now indicate to the operator whether or not any damage has been done the formation and, as previously described with respect to the interpretation of the diagrams illustrated in FIG. 3, this information will be useful in determining the presence or absence of hydrocarbons in the formation traversed by the logging tool 200.

In the system 203, it is desirable that the time intervals compared are those determined when the midpoint between the transmitter T1 and the receiver R1 and the midpoint between the transmitter T1 and receiver R2 are opposite the same point along the borehole. To this end there is provided the time delay means 213 shown comprised of a magnetic delay line drum 230, a recording head 231, playback head 232, and an erase head 233 energized from erase oscillator 234. The playback head 232 is spaced from the recording head 231 a distance equivalent to one-half the spacing between the receivers R1 and R2. The drum 230 is driven by way of a mechanical connection, illustrated by the dashed lines 235, 228 to the sheave 227. With such an arrangement and assuming that the midpoint between the transmitter T1 and the receiver R1 is a point 240 along the well bore, the time interval representing unit travel time between the transmitter T1 and receiver R1 is now recorded on the recording medium of the drum 230. Now, as the logging tool continues to move upward in the borehole, the drum 230 is rotated in the direction of the arrow. At the time the midpoint between the transmitter T1 and the receiver R2 attains the point or position 240 along the borehole wall, the previously measured time interval recorded on the recording medium of the drum 230 has reached the playback head 232 and is applied to comparator 215. At the same time, the new measurement of interval travel time obtained by employing the transmitter T1 and the receiver R2 is applied from the output of the signal divider unit 223 to the comparator 215.

In a typical arrangement where the receivers are spaced a distance of six feet, the heads 231 and 232 of the delay line would be spaced approximately three feet apart. In the alternative, the head spacing may be reduced considerably by employing a gear reducer 241 in the driving train between the sheave 227 and the drum 230. Thus, for example, if the gear reducer has a ratio of 2 to 1, then the heads need only be spaced 1.5 feet apart. If the reduction is 10 to 1, then the heads need only be spaced 0.3 foot apart.

The operation of system 203 of FIG. 10 is effective to practice the method of the present invention where time measurements are made of the travel of acoustic energy first by way of a path adjacent to the borehole wall and secondly by way of a path remote from the borehole wall. These time intervals representative of travel time over a predetermined common distance, which can be a unit distance, are then compared to produce a new form of log which will depict formation damage and also can be interpreted as indicating the presence or absence of hydrocarbons in the damage formations.

It is now obvious that in order for a comparison log to be produced, the time intervals to be compared must be time intervals measured over the same distance, or equivalents thereof; that is, where the transducers employed are spaced different distances apart the measured time intervals must be converted to a unit time. Of course, in those systems employing the common transducers, i.e., receivers R1 and R2 of FIG. 1, to produce the time interval measurement, it is also contemplated that a signal divider may be employed, for example, with the switch and condenser units 35 and 39, so that the input to the comparator will be in terms of microseconds per foot.

A suitable cathode follower and signal divider is illustrated in FIG. 11 wherein the cathode follower includes a triode 250. The grid of the triode 250 is connected by way of a conductor 251 to the output of unit 35 or 39. The anode is connected to a suitable source of D.C. labeled B+. The cathode is connected by way of a potentiometer 252 to ground. The potential developed across the potentiometer 252 is representative of the total travel time measured between two of the transducers, for example, the transmitter T1 and the receiver R2. By sliding the movable contact 253 of the potentiometer 252 up or down, adjustment can be made in the amplitude of the output signal. Suitable calibrations may be provided so that the output from the potentiometer 252 can either be in terms of microseconds per foot or in any other desirable units.

Thus, in all embodiments of the present invention there is provided a log depicting the characteristics of earth formations adjacent to and remote from the well bore. From this information as above described, an interpreter may determine if the formation has been invaded and, if invaded, such information will be useful in the determination of the presence of hydrocarbon formations. And in all instances there will be available an accurate log of the true velocity characteristics of the earth formations taken along a path remote from the borehole so as to make available information useful to a seismologist in the interpretation of seismograms.

What is claimed is:

1. In a system for producing records representative of the velocity characteristics of earth strata traversed by a well bore, a first transmitter for producing pulses of acoustic energy at least a portion of which travels through the earth formation along a path adjacent wall structure of the well bore, a second transmitter for producing pulses of acoustic energy at least a portion of which travels through the formation along a path more remote from the wall structure of the well bore than said first-mentioned path, means responsive to the acoustic energy traveling along said first-mentioned path for producing a first pair of time-spaced electric signals representing the travel time of acoustic energy over a predetermined distance and representative of the velocity characteristics of the earth formation traversed by said path adjacent the well bore, means responsive to the acoustic energy traveling along said second-named path for producing a second pair of time-spaced electric signals representing the travel time of acoustic energy over a predetermined distance which is the same as said aforementioned predetermined distance and representative of the velocity characteristics of the same earth formation at a portion remote from the well bore, a timing circuit coupled to both of said last-named means responsive to the acoustic energy for producing first and second time functions respectively representing the time spacing between the electric signals for each of said first and second pairs of time-spaced electric signals, a comparator circuit for comparing the first function with the second function to generate a comparison signal representative of the oil-bearing character of the formation traversed by the well bore, and means coupled to said comparator circuit for recording said comparison signal.

2. A velocity well logging system comprising first and second time interval measuring means, a transmitter for generating pulses of acoustic energy, first, second, and third receivers spaced from said transmitter and from each other along the length of a well bore, said first time interval measuring means being coupled to said first receiver and said second receiver, said first time interval measuring means being responsive to the production of an electric signal by said first receiver upon arrival of a first acoustic pulse from said transmitter to initiate the generation of a first time function, said first time interval measuring means being responsive to the arrival of said first acoustic pulse at said second reeciver for producing from said first time function a first velocity function representative of the velocity characteristics of earth strata traversed by said first acoustic pulse, said second time interval measuring means being coupled to said second receiver and said third receiver, said second time interval measuring means being responsive to an electric signal produced by said second receiver in response to the arrival at said second receiver of a second acoustic pulse generated by said transmitter for initiating the production of a second time function, said second time interval measuring means being responsive to the arrival of said second acoustic pulse at said third receiver for producing from said second time function a second velocity function representative of the velocity characteristics of said earth strata traversed by said second acoustic pulse and bounded by said second and third receivers, and means for recording said first velocity function and said second velocity function.

3. A velocity well logging system comprising first and second time interval measuring means, a plurality of transducers including at least two transmitters and at least one receiver arranged in fixed relation one to the other with the transmitters both positioned to one side of said receiver, switching means coupled to said transmitters and responsive to acoustic pulses generated by said transmitters for controlling the alternate generation of acoustic pulses by said transmitters, means coupled to one of said transmitters and responsive to the generation of acoustic pulses by one of said transmitters for generating a negative-going control pulse, means coupled to the other of said transmitters and responsive to the generation of acoustic pulses by the other of said transmitters for generating a positive-going control pulse, and gating means responsive to said negative-going control pulse for conditioning said first time interval measuring means for response to the appearance of said acoustic pulses at one of said transducers and gating means responsive to said positive-going control pulse for conditioning said second time interval measuring means for response to the appearance of said acoustic pulses at another of said transducers.

4. The system of claim 3 further including a monotonic signal generator which initiates the production of a first monotonic function in response to the arrival at one of said transducers of an acoustic pulse generated by a first of said transmitters and initiates the production of a second monotonic function upon the arrival at said one transducer of an acoustic pulse generated by a second of said transmitters, means for alternately sampling the magnitudes of said monotonic functions in response to the appearance of said acoustic pulses from said transmitters at a second transducer spaced from said first-mentioned transducer, and means for separately recording the sampled magnitudes of said monotonic functions.

5. The system of claim 4 in which there is provided a comparator circuit to which the sampled monotonic functions are applied for generation of a comparison signal, and recording means responsive to an output of said comparator for recording the comparison signal.

6. A velocity well logging system comprising first and second time interval measuring means, a plurality of transducers including at least two transmitters and at least one receiver arranged in fixed relation one to the other, switching means coupled to said transmitters and responsive to acoustic pulses generated by said transmitters for controlling the alternate generation of acoustic pulses by said transmitters, means coupled to one of said transmitters and responsive to the generation of an acoustic pulse by one of said transmitters for generating a first control pulse, means coupled to the other of said transmitters and responsive to the generation of an acoustic pulse by the other of said transmitters for generating a second control pulse of character different from said first control pulse, gating means responsive to said first control pulse for conditioning said first time interval measuring means for response to the appearance of said acoustic pulses at one of said transducers and gating means responsive to said second control pulse for conditioning said second time interval measuring means for response to the appearance of said acoustic pulses at another of said transducers.

7. In a system for producing records representative of the velocity characteristics of earth strata traversed by a well bore, a first transmitter circuit for producing pulses of acoustic energy at least a portion of which travels through the earth strata along a first path adjacent the wall structure of the well bore, a second transmitter circuit for producing acoustic pulses at least a portion of which travels through the earth strata along a second path more remote from the structure of the well bore than said first path, time interval measuring means, first and second receivers to the arrival of said acoustic pulses from said first transmitter circuit for generating a first set of electric signals, means in said first transmitter circuit and in said second transmitter circuit and responsive to the production of acoustic pulses in said transmitter circuits for generating first and second control pulses distinctive one from the other and respectively representative of the production of acoustic pulses by said first and second transmitter circuits, means responsive to said first control pulse for conditioning said measuring means for response to said first set of electric signals, a first signal transmission means interconnecting said receivers and said measuring means for applying said first set of electric signals to said time interval measuring means for production of a first function representative of the velocity charcteristics of the earth strata traversed by said first path, said first and second receivers being responsive to the acoustic pulses from said second transmitter circuit for producing a second set of electric signals, means responsive to said second control pulse for conditioning said measuring means for response to said second set of electric signals, a second signal transmission means interconnecting said receivers and said measuring means for application of said second set of electric signals to said time interval measuring means for production of a second function representative of the velocity characteristics of the same earth formation at a portion remote from the well bore and traversed by said second path, and means responsive to said functions for recording said first function and said second function.

8. The system of claim 7 in which said first transmitter circuit, said second transmitter circuit, and said second and first receivers are spaced one from another along the well bore and in which said second transmitter circuit is more remote from said first and second receivers than said first transmitter circuit for transmission of the acoustic energy produced by said first transmitter circuit from said first transmitter circuit to said first and second receivers along said second path remote from the wall structure of the well bore.

9. A method of acoustical well logging comprising: generating acoustical impulses at a point within a borehole; receiving said acoustical impulses over at least two separate equal length intervals, said equal length intervals being located at different ranges from said point and registering on a scale related to the depth of said point in the borehole a quantity whose magnitude is related to the difference in travel time of the acoustical impulse over said two separate equal length intervals.

10. A method of acoustical well logging comprising: generating acoustical impulses at points within a borehole; generating signals indicating the duration of time periods required for said acoustical impulses to travel two equal intervals located at different fixed ranges from said points in the borehole; transmitting the generated signals to the surface and registering quantities whose magnitudes are related to the difference between the two time periods indicated by said signals.

11. An acoustic well logging system comprising:
a plurality of acoustic transducers including at least one transmitter and at least three receivers,
transmission means for transmitting to the surface of the earth electric signals indicative of the occurrence of acoustic energy at each of said transducers,
gating means connected to said transmission means at the surface of the earth for separating said electric signals into at least two pairs of said signals, and
time measuring means connected to said gating means for measuring the time interval between each pair of electric signals.

12. An acoustic well logging system comprising:
a plurality of transducers including a transmitter and at least three receivers of acoustic energy,
function generating means for generating a first function representing the travel time of an acoustic pulse between a first pair of said transducers and for generating a second function representing the travel time of an acoustic pulse between a second pair of said transducers, said second pair of transducers having at least one transducer in common with said first pair of said transducers, and
difference means for generating the difference between said first and said second functions.

13. A velocity logging system for determining characteristics of earth formations along a borehole comprising:
a plurality of vertically spaced transducers including at least a transmitter, a first receiver and a second receiver,
time interval measuring means including
a common monotonic function generator responsive to the appearance of acoustic energy at one of said transducers to initiate the generation of a monotonic function, and
means respectively responsive to the appearance of acoustic energy at said first and said second receivers for sampling the instantaneous magnitude of said monotonic function,
said time intreval measuring means producing a first function representative of the travel time of acoustic energy through the earth formation between two of said transducers by way of a path adjacent the borehole, and a second function representative of the travel time of acoustic energy through the earth formation between two of said transducers by way of a path remote from the borehole,
means for converting said first and second time functions to third and fourth time functions representative of travel time over the same unit distance, and
means for comparing the magnitudes of said third and fourth functions.

14. The system of claim 13 in which the first-mentioned two transducers are said transmitter and said first receiver and in which the last-named two transducers are said transmitter and said second receiver.

15. The system of claim 13 in which said converting means are each comprised of a voltage divider.

References Cited by the Examiner
UNITED STATES PATENTS

| | | | |
|---|---|---|---|
| 2,301,458 | 11/1942 | Salvatori | 181—0.5 |
| 2,708,485 | 5/1955 | Vogel | 181—0.5 |
| 2,813,590 | 11/1957 | McDonald | 181—0.5 |
| 3,149,304 | 9/1964 | Summers | 340—18 |
| 3,191,145 | 6/1965 | Summers | 181—0.5 |

BENJAMIN A. BORCHELT, *Primary Examiner.*

CHESTER L. JUSTUS, SAMUEL FEINBERG,
*Examiners.*

R. M. SKOLNIK, V. J. DIPIETRO, *Assistant Examiners.*

UNITED STATES PATENT OFFICE
CERTIFICATE OF CORRECTION

Patent No. 3,312,934  April 4, 1967

Allen A. Stripling et al.

It is hereby certified that error appears in the above numbered patent requiring correction and that the said Letters Patent should read as corrected below.

Column 6, line 17, after "United States" insert -- Patent --; line 43, for "thte" read -- the --; line 45, for "puse" read -- pulse --; column 9, line 35, and column 16, line 11, for "damage", each occurrence, read -- damaged --; column 9, line 66, for "alnong" read -- along --; column 11, line 54, for "by the" read -- by --; column 17, line 5, before "second" insert -- said --; column 18, line 39, before "to" insert -- responsi --; column 20, line 13, for "intreval" read -- interval --.

Signed and sealed this 7th day of November 1967.

(SEAL)

Attest:

Edward M. Fletcher, Jr.

Attesting Officer

EDWARD J. BRENNER

Commissioner of Patents